United States Patent
White et al.

(10) Patent No.: US 7,800,865 B2
(45) Date of Patent: Sep. 21, 2010

(54) DISC DRIVE HEAD ACTUATOR

(75) Inventors: Andrew White, Minneapolis, MN (US); Joel Limmer, Bloomington, MN (US); Roger Hipwell, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 849 days.

(21) Appl. No.: 11/656,919

(22) Filed: Jan. 23, 2007

(65) Prior Publication Data

US 2008/0174919 A1     Jul. 24, 2008

(51) Int. Cl.
G11B 17/02     (2006.01)
(52) U.S. Cl. .................................................. 360/265.7
(58) Field of Classification Search ........................ None
See application file for complete search history.

(56) References Cited

U.S. PATENT DOCUMENTS

| | | | |
|---|---|---|---|
| 5,025,346 A | 6/1991 | Tang et al. | |
| 5,101,669 A | 4/1992 | Holm-Kennedy | |
| 5,710,678 A | 1/1998 | Leuthold et al. | |
| 5,856,895 A | 1/1999 | Schaenzer | |
| 6,079,088 A | 6/2000 | Schaenzer | |
| 6,208,485 B1 * | 3/2001 | Chainer et al. | 360/98.07 |
| 6,318,176 B1 | 11/2001 | McKenzie | |
| 6,430,001 B1 | 8/2002 | Chainer et al. | |
| 6,499,881 B2 | 12/2002 | Boutaghou et al. | |
| 6,507,463 B1 | 1/2003 | Boutaghou | |
| 6,611,399 B1 | 8/2003 | Mei et al. | |
| 6,629,448 B1 | 10/2003 | Cvancara | |
| 6,655,002 B1 | 12/2003 | Maimone et al. | |
| 6,683,757 B1 | 1/2004 | Bonin et al. | |
| 6,731,465 B2 | 5/2004 | Crane et al. | |
| 6,757,140 B1 * | 6/2004 | Hawwa | 360/294.5 |
| 6,832,383 B2 | 12/2004 | Holmberg et al. | |
| 6,865,044 B1 | 3/2005 | Albrecht et al. | |
| 6,882,488 B1 | 4/2005 | Albrecht et al. | |
| 6,906,879 B1 | 6/2005 | Albrecht et al. | |
| 7,077,010 B2 | 7/2006 | Gangpathi | |
| 7,480,981 B2 * | 1/2009 | Takada et al. | 29/603.04 |
| 2003/0030527 A1 | 2/2003 | Mhani | |
| 2004/0119354 A1 | 6/2004 | Takada et al. | |
| 2005/0006227 A1 | 1/2005 | Hao et al. | |

(Continued)

FOREIGN PATENT DOCUMENTS

WO     WO 01/27638 A1     4/2001

OTHER PUBLICATIONS

U.S. Appl. No. 11/348,930, Xue et. al.

(Continued)

*Primary Examiner*—Mark Blouin
(74) *Attorney, Agent, or Firm*—Fellers, Snider, et al.

(57) ABSTRACT

A disc drive head actuator includes a suspension structure and a slider integrated with the suspension structure. The actuator is one of at least two actuator assemblies batch-fabricated on a common substrate. The head actuator may be fabricated using mircofabrication techniques. The head actuator may have a reduced size, including package height relative to conventionally manufactured disc drives. Using mircofabrication and/or batch fabrication techniques provides reduced tolerances, which allows for increased actuation forces and/or reduced power consumption. Some embodiments include four-bar linkage actuators, which increase lateral stiffness of the actuator, allowing for a precise motion of the head relative to a media surface.

29 Claims, 8 Drawing Sheets

U.S. PATENT DOCUMENTS

2005/0122609 A1 6/2005 Albrecht et al.
2005/0145729 A1 7/2005 Stewart et al.

OTHER PUBLICATIONS

Product Brochure for The Bearing Solution, Bearing Co., Inc., 5 pages, printed Apr. 17, 2006.
Product Brochure for Technical Data, Bearing Co., Inc., 8 pages, printed Apr. 17, 2006.
www.incabloc.ch/incablocANG.html, 1 page, accessed on Apr. 17, 2006.
www.dbanks.demon.co.uk/ueng/; Home Page; Retrieved on Dec. 12, 2006; 1 page.
Wang, Li-Peng; Wolf, Richard; Wang, Yu; Deng, Ken; Zou, Lichen; Davis, Robert; Trolier-McKinstry, Susan; Design, Fabrication, and Measurement of High-Sensitivity . . . Piezoelectric Microelectromechanical Systems Accelerometers; Journal of Microelectromechanical Systems; Aug. 2003, p. 433-439, vol. 12, No. 4.
U.S. Appl. No. 11/656,714.
U.S. Appl. No. 11/656,659.
U.S. Appl. No. 11/656,811.
U.S. Appl. No. 11/656,692.
U.S. Appl. No. 11/656,714, Hipwell, Roger.
U.S. Appl. No. 11/656,659, Johnston, Alan.
U.S. Appl. No. 11/656,811, Hipwell, Roger.
U.S. Appl. No. 11/656,692, Johnston, Alan.

* cited by examiner

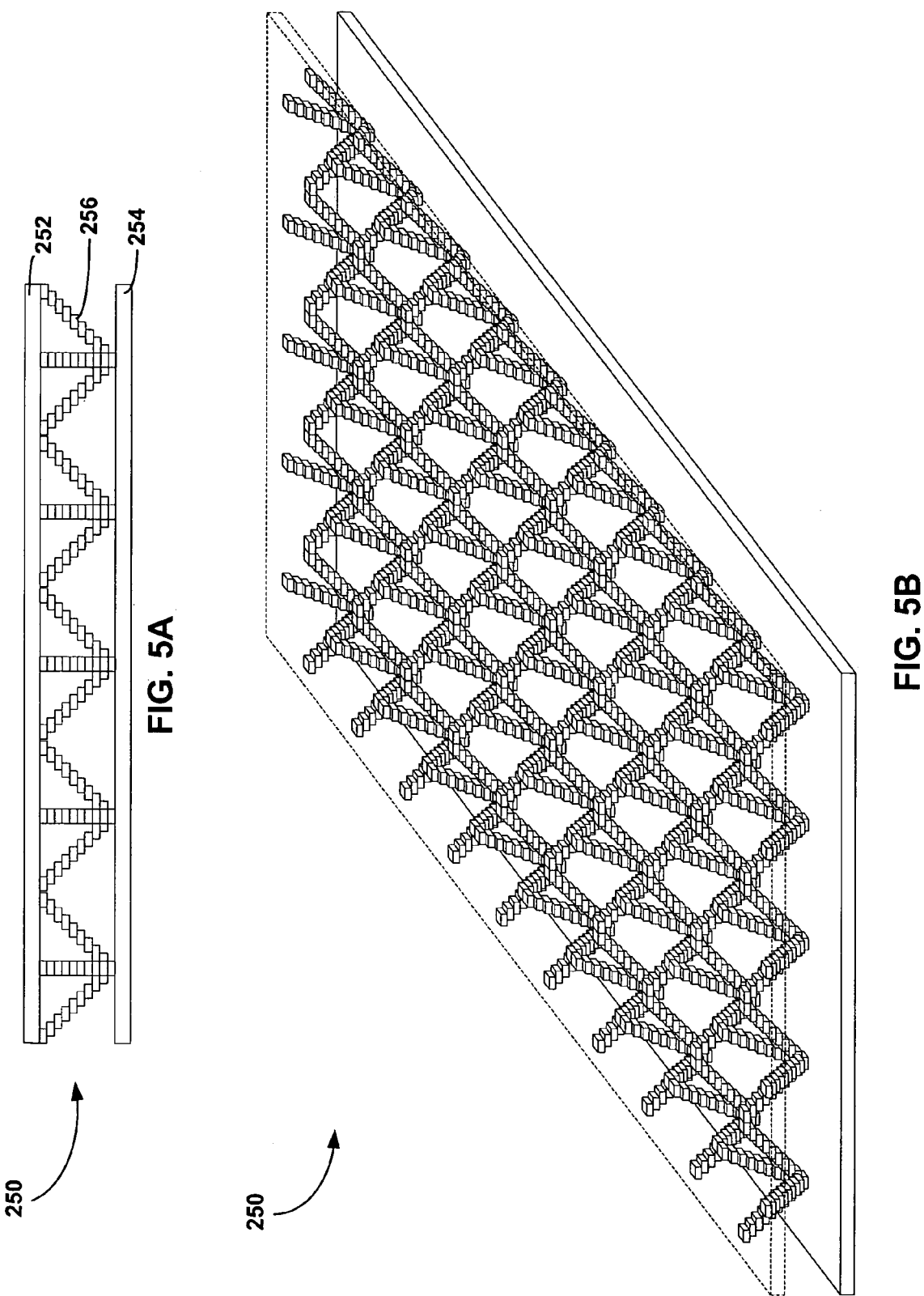

DISC DRIVE HEAD ACTUATOR

TECHNICAL FIELD

The invention relates to actuators.

BACKGROUND

A disc drive typically includes a base to which various drive components are mounted. A cover connects with the base to form a housing that defines an internal, sealed environment. The components include a spindle motor, which rotates one or more discs at a constant high speed. Information is written to and read from tracks on the discs through the use of an actuator assembly. The actuator assembly includes one or more actuator arms, which extend towards the discs. Mounted on each of the actuator arms is a head, which includes one or more transducer elements to perform read operations, write operations or read and write operations. Heads generally also include an air bearing slider enabling the head to fly in close proximity above the corresponding media surface of the associated disc. An air bearing slider does not necessarily need air to operate. For example, in some designs, the internal environment of a disc drive may be filled with a fluid other than air, e.g., helium.

Increases in storage media density have allowed disc drive manufactures to produce disc drives with large capacities, but which are much smaller than disc drives generally found in desktop computers. For example, a five gigabyte disc drive having a smaller profile than a credit card, and a thickness less than a quarter-inch is currently available. Small disc drives are scaled versions of what has been developed for larger versions.

However, smaller disc drive designs create new challenges. Current disc drive designs have begun to reach the limits of conventional manufacturing techniques. Smaller disc drives developed for consumer electronics, e.g., cell phones and PDAs, must withstand higher shocks than desktop or laptop computer disc drives. Manufacturing tolerances of the mechanical components of a disc drive are relatively crude in small form factor drives. For this reason, physical stops, e.g., gimbal limiters, used in conventional disc drives to prevent the actuator assembly from contacting the media surface are only effective for large displacement shocks. In another example, the minimum thickness of a disc drive can be limited because suitable rotary bearings for the actuator assembly become difficult to manufacture for disc drive design with a small height, e.g., a height of less than 3.5 millimeters (0.14 inches). Also, manufacturing tolerances for disc drive designs force the gap between the permanent magnet and the voice coil of the actuator assembly to be at least about 25 micrometers. A smaller gap would be preferred to provide greater force, require less energy to move the actuator assembly, and/or use a smaller actuation mechanism, which generally includes a permanent magnet and voice coil. These and other challenges must be met to develop even smaller disc drive designs.

In a separate development, micro-electromechanical systems (MEMS) microstructures are manufactured in batch methodologies similar to computer microchips. The photolithographic techniques that mass-produce millions of complex microchips can also be used simultaneously to develop and produce mechanical sensors and actuators integrated with electronic circuitry. Most MEMS devices are built on wafers of silicon, but other substrates may also be used. MEMS manufacturing processes adopt micromachining technologies from integrated circuit (IC) manufacturing and batch fabrication techniques.

Like ICs, the structures are developed in thin films of materials. The processes are based on depositing thin films of metal, insulating material, semiconducting material or crystalline material on a substrate, applying patterned masks by photolithographic imaging, and then etching the films to the mask. In addition to standard IC fabrication methods, in MEMS manufacturing a sacrificial layer is introduced—a material which keeps other layers separated as the structure is being built up but is dissolved in the very last step leaving selective parts of the structure free to move.

Use of established "batch" processing of MEMS devices, similar to volume IC manufacturing processes, eliminates many of the cost barriers that inhibit large scale production using other less proven technologies. Although MEMS fabrication may consist of a multi-step process, the simultaneous manufacture of large numbers of these devices on a single wafer can greatly reduce the overall per unit cost.

Surface micromachining, bulk micromachining and electroforming (lithography, plating and molding) constitute three general approaches to MEMS manufacturing. Surface micromachining is a process based on the building up of material layers that are selectively preserved or removed by continued processing. The bulk of the substrate remains untouched. In contrast, in bulk micromachining, large portions of the substrate are removed to form the desired structure out of the substrate itself. Structures with greater heights may be formed because thicker substrates can be used for bulk micromachining as compared to surface micromachining.

Electroforming processes combine IC lithography, electroplating and molding to obtain depth. Patterns are created on a substrate and then electroplated to create three-dimensional molds. These molds can be used as the final product, or various materials can be injected into them. This process has two advantages. Materials other than the wafer material, generally silicon, can be used (e.g. metal, plastic, ceramic) and devices with very high aspect ratios can be built. Electroforming can also be a cost-effective method of manufacturing due to, e.g., relatively inexpensive processing equipment.

Another fabrication technique is wafer bonding. Wafer bonding can be used to bond micromachined silicon wafers together, or to other substrates, to form larger more complex devices. Examples of wafer bonding include anodic bonding, metal eutectic bonding and direct silicon bonding. Other bonding methods include using an adhesive layer, such as a glass, or photoresist.

MEMS fabrication processes usually include deposition, etching and lithography. These processes are repeated in according to an ordered sequence to produce the layers and features necessary for the MEMS structure. Deposition refers to the deposit of thin films of material and includes depositions from chemical reactions and depositions from physical reaction. Depositions from chemical reactions include chemical vapor deposition, electrodeposition, epitaxy, and thermal oxidation. These processes use solid material created directly from a chemical reaction in gas/or liquid compositions or with the substrate material. Generally, the chemical reaction will also produce one or more byproducts, which may be gases, liquids and even other solids. Depositions from physical reactions include physical vapor deposition (e.g., evaporation or sputtering) and casting. In depositions from physical reactions a deposited material is physically placed on the substrate without creating a chemical byproduct.

Etching is a process of removing portions of deposited films or the substrate itself. Two types of etching processes are wet etching and dry etching. Wet etching dissolves the material by immersing it in a chemical solution. Dry etching occurs by dissolving the material using reactive ions or a vapor phase etchant.

Lithography in the MEMS context is typically the transfer of a pattern to a photosensitive material by selective exposure to a radiation source such as light. When a photosensitive material is selectively exposed to radiation, e.g. by masking some of the radiation, the radiation pattern on the material is transferred to the material exposed. In this manner, the properties of the exposed and unexposed regions differ.

Deposition, etching and lithography processes may occur in combination repeatedly in order to produce a single MEMS structure. Lithography may be used to mask portions of a film or the substrate. Masked portions may be protected during a subsequent etching process to produce precise MEMS structures. Conversely, masked portions may themselves be etched. This process can be used to make a component or a mold for a component. For example, multiple layers of film can be deposited onto a substrate. Following each deposition step, a lithography step may be preformed to define a desired cross section of a MEMS structure through that layer. After a desired number of layers have been deposited and individually subjected to radiation patterns in lithography steps, portions of the layers defining the MEMS structure can be removed with a single etching process, leaving a mold behind for the desired MEMS structure. A compatible material may then be injected into the mold to produce the desired MEMS structure. As shown by this example, precise and complex structures may be produced using MEMS techniques.

SUMMARY

In general, the invention is directed to mircromachined and/or batch-fabricated actuators for disc drives. For example, in an embodiment, an actuator may include a four-bar linkage, which can minimize skew and provide linear or near-linear actuation. Actuator linkages may be manufactured with a three-dimensional truss structure using MEMS techniques. MEMS techniques allow production of head actuators having low-mass and high stiffness, which can reduce actuation force requirements and power consumption.

MEMS techniques also allow for a variety of components from a conventional disc drive to be manufactured as an integrated device. An actuator may be fabricated from an electroformed metal with integrated electrical interconnects, integrated voice coil, integrated head, gimbal assembly and one or more flexural rotary bearings. Embodiments may also include conventional hinged bearings. Integrated actuators and bearings manufactured using MEMS techniques may provide a smaller Z-height than actuator/bearing assemblies currently used in disc drives.

In one embodiment, the invention is directed to disc drive head actuator comprising a suspension structure, and a slider integrated with the suspension structure. The actuator is one of at least two actuators batch-fabricated on a common substrate.

In another embodiment, the invention is directed to a disc drive head actuator comprising a beam and flexural bearing coupled to a proximate end of the beam. The flexural bearing provides a pivot point that allows actuation of the beam. The flexural bearing has a thickness of less than 4 millimeters as measured along its axis of rotation. In a different embodiment, the invention is directed to a method comprising placing at least two structural layers of a disc drive head actuator on a substrate to form the disc drive head actuator and releasing the least two structural layers from the substrate to separate the disc drive head actuator from the substrate.

Embodiments of the invention may provide one or more of the following advantages. For example, actuators having four-bar linkages may minimize skew and maximize the precision above a media surface in which a head operates. Four-bar linkages can also be designed to provide linear or near-linear motion for a head.

Actuators manufactured using MEMS techniques allow a reduction in the Z-height of a disc drive by providing actuator bearings with smaller Z-heights and or smaller actuator actuation mechanisms, such as a voice coil motors. Improved tolerances provided by MEMS manufacturing techniques may also result in improved efficiency for an actuation voice coil motor by reducing the gap between the voice coil and the permanent magnet. Improved tolerances provided by MEMS techniques also allow for smaller gaps between an actuator arm and motion limiters, which can provide better protection for a disk drive from external shocks.

Another benefit of head actuators manufactured using MEMS techniques is that the actuators themselves or the integrated component which the actuators are a part of may be batch fabricated. Batch fabrication allows multiple components to be manufactured on a common substrate or substrates. This can reduce manufacturing costs compared to conventional manufacturing techniques.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5A-5B illustrate a three-dimensional truss structure, which may be used as part of a micromachined actuator.

DETAILED DESCRIPTION

Figure 1A:
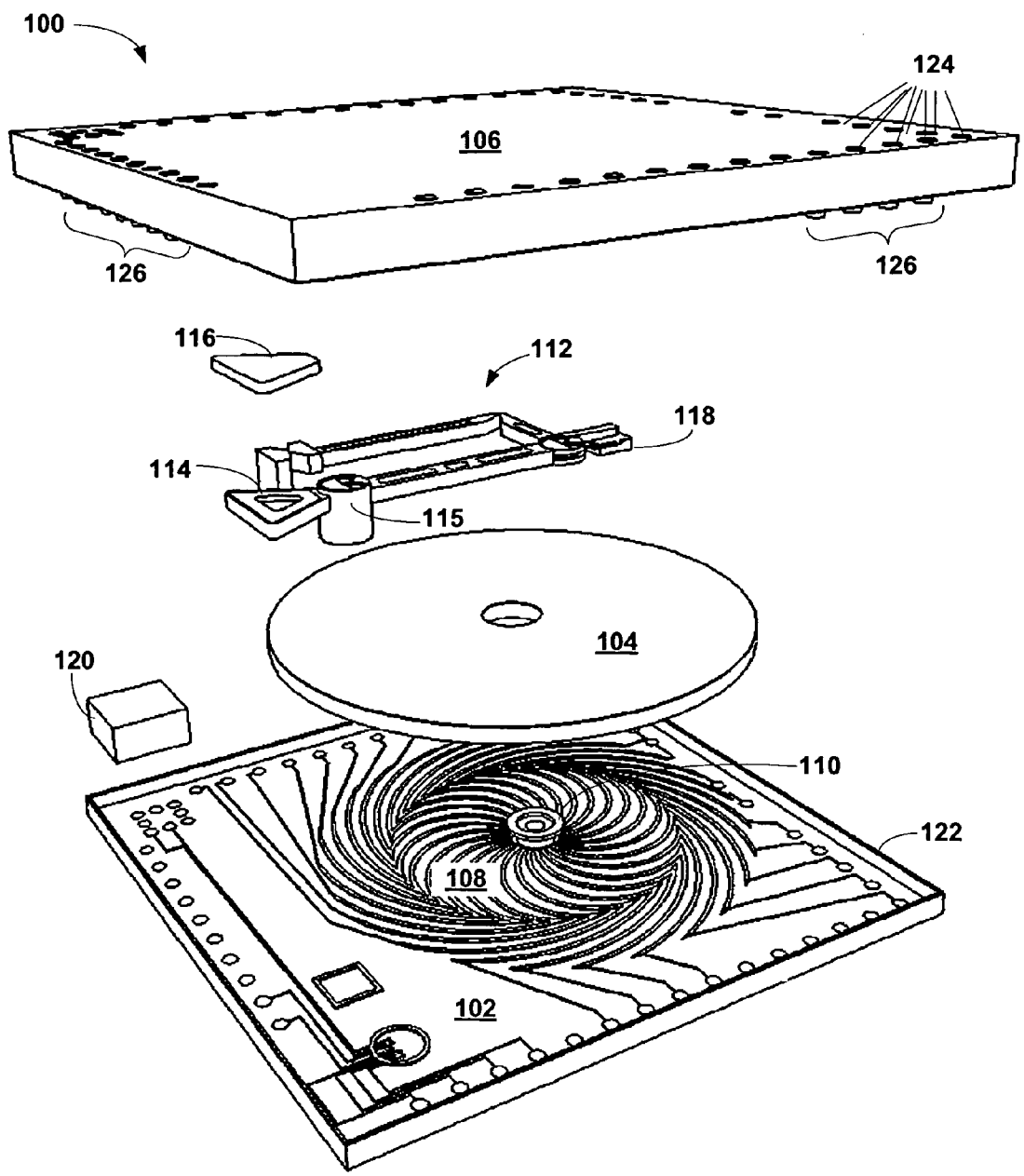
FIGS. 1A-1C illustrate a disc dive manufactured using MEMS techniques.
Figure 1B:
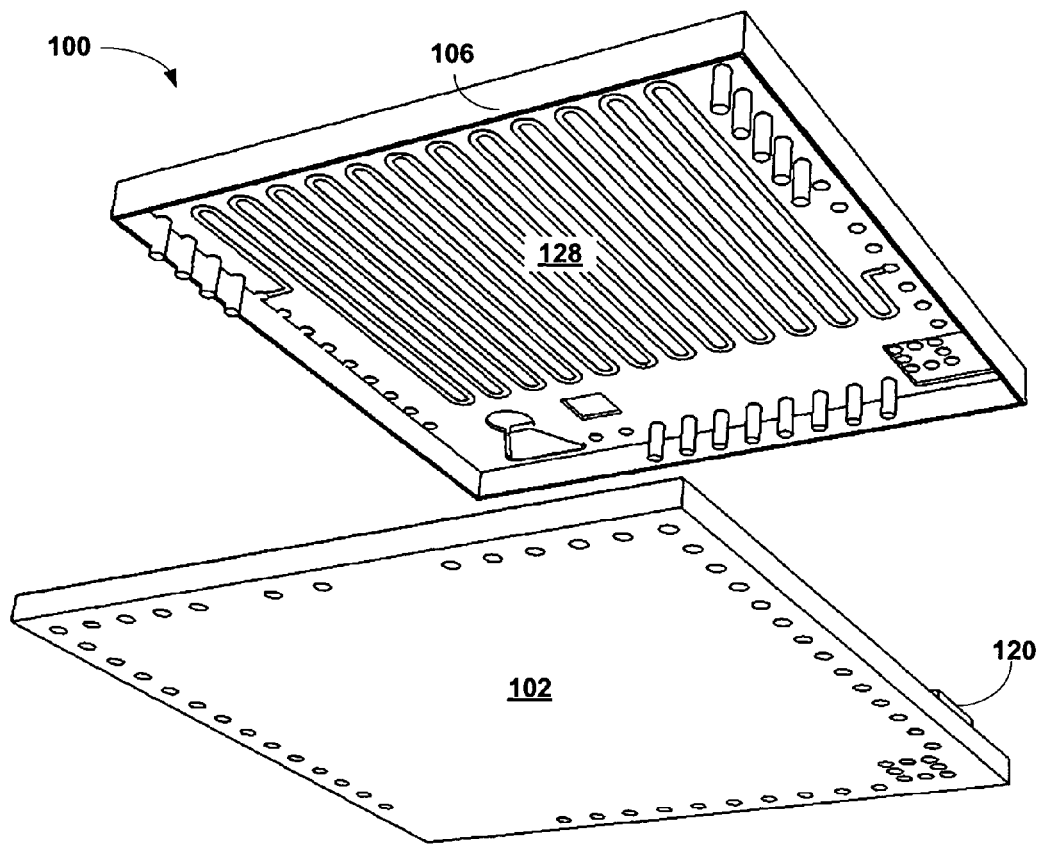
Figure 1C:
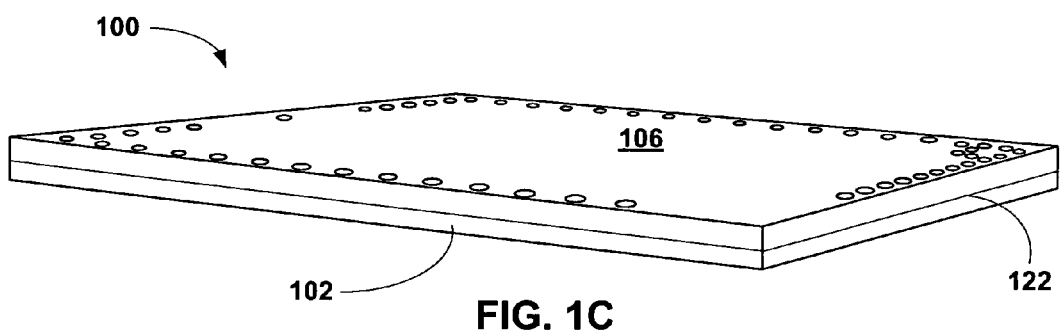

FIGS. 1A-1C illustrate disc dive 100 manufactured using MEMS techniques. FIGS. 1A and 1B are exploded peripheral views of disc drive assembly 100. FIG. 1C shows a disc drive 100 as manufactured. Various components of disc drive assembly 100 are manufactured using MEMS fabrication techniques. Generally speaking, MEMS is the integration of mechanical elements, sensors, actuators, and/or electronics on a substrate using microfabrication technology. The term "substrate" is used generically used throughout this document. For example, the term substrate is synonymous for terms such as sheet, wafer, film, platen, platform, plate and base as commonly used by those of skill in the art.

As an example, the substrate may be silicon commonly used to make integrated circuits (ICs). MEMS components of disc drive assembly 100 are fabricated using microfabrication process sequences. Micromechanical components, e.g., actuator 112, are fabricated using compatible "micromachining" processes that selectively etch away parts of the silicon wafer or add new structural layers to form the mechanical and electromechanical devices. Micromachining techniques include lithographic and electroplating techniques.

Disc drive assembly 100 includes a base 102, disc 104 and cover 106. Disc drive 100 also includes a seal 122 between cover 106 and base 102 to prevent external contaminants from entering an internal environment of disc drive 100 through a seam formed between cover 106 and base 102. Seal 122 also allows disc drive to contain a fluid. For example, in some embodiments the internal environment may hold helium, or in other embodiments a liquid. For example, an internal environment holding a liquid may be useful to provide a boundary layer between moving parts of disc drive assembly 100.

Electronics 120 and actuator 112 are mounted to base 102. Base 102 also includes integrated disc actuator electrodes 108. Electrodes 108 interact with elements integrated into disc 104 to rotate disc 104 about bearing 110. Actuator 112 includes head 118 to read and/or write or data from disc 104. Actuator 112 also includes coil 114, e.g., coil 114 may be a voice coil, which interacts with permanent magnet 116 to actuate actuator 112 to place head 118 in a desired position relative to disc 104. Other embodiments use other actuation methods such as electrostatic actuation. Integrated components of base 102 may be created using microfabrication processes performed on a single substrate wafer. In some embodiments, microfabrication processes may be used to form more than one of bases 102 on a single wafer.

Like base 102, cover 106 may include integrated components manufactured using a batch fabrication process, which may provide manufacturability, cost, and/or performance improvements. For example, permanent magnet 116 may be integrated with cover 106. As shown if FIG. 1B, cover 106 includes an integrated environmental control component 128. Integrated environmental control component 128 may be a resistive element to heat disc drive 100 and/or a cooler, e.g., Peltier cooling system. Integrated environmental control component 128 provides a controlled environment for disc drive 100.

Figure 2:
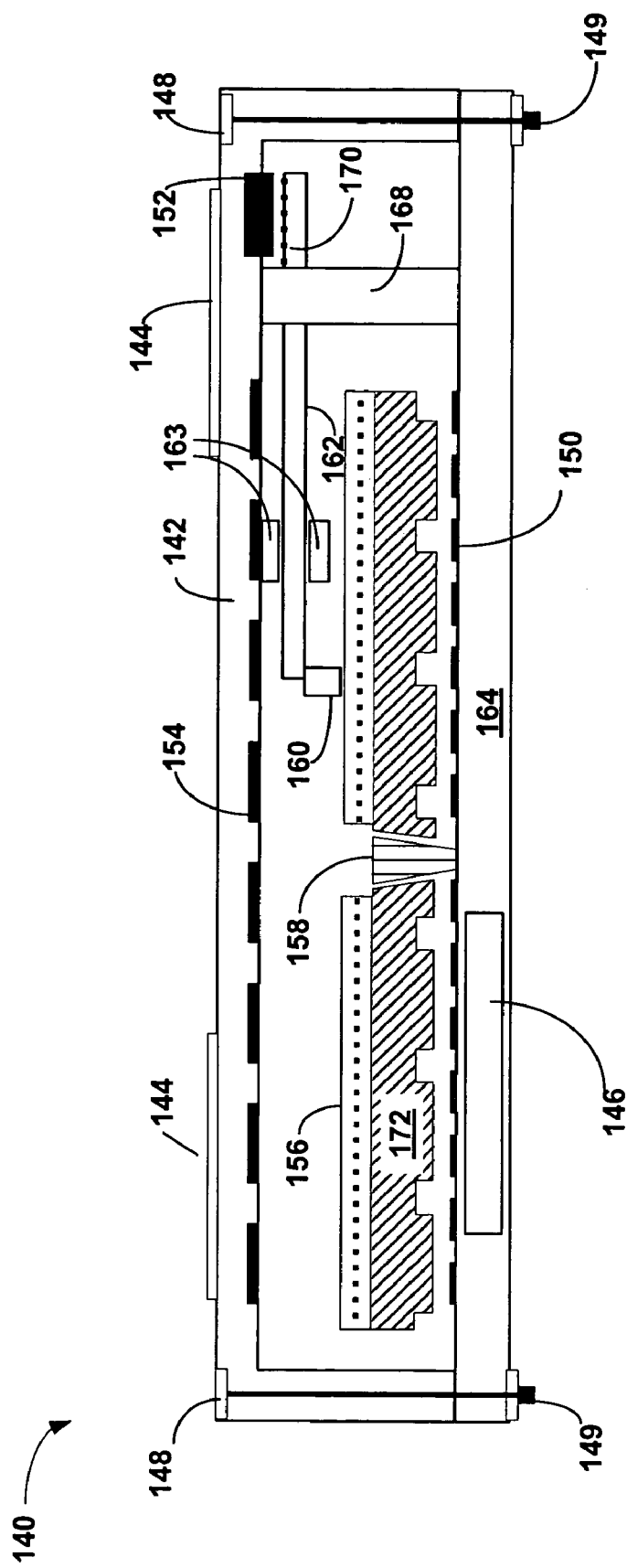
FIG. 2 is a cut-away illustration of a disc dive manufactured using MEMS techniques.

In other embodiments, as shown in FIG. 2, disc drive 100 may also include integrated sensors, such as a thermometer, gyroscope, position sensor, pressure sensor, or accelerometer. Such sensors may be used independently or in conjunction with integrated environmental control component 128. Sensors and/or integrated environmental control component 128 can allow disc drive 100 to respond to changing environmental conditions and/or to shocks and other events. This may increase reliability of disc drive 100, expand allowable operating conditions and/or control the effect of thermal expansion on components of disc drive 100. 100351 As shown in FIG. 1A, cover 106 also includes vias 124, which provide connections between multiple disc drive 100s arranged in a stack or an array. For example, as shown in FIG. 1A vias 124 connect to electrodes 108. With these connections, electrodes 108 may be activated simultaneously to rotate disc 104 with actuation electrodes 108 in one or more other disc drives 100. Vias 124 may also connect electronics 120 between multiple disc drives 100. In this manner, a device having only single disc drive interface may control a stack or an array of disc drives. Electrical studs 126 connect base 102 to vias 124 on cover 106. In disc drive 100, not all vias 124 are paired with one of electrical studs 126, in other embodiments may include more or less vias 124 and/or more or less electrical studs 126.

Disc drive 100 may be manufactured according to a variety of micromachining operations. For example, in one embodiment, base 102 including integrated actuator 112, electronics 120 and disc actuator electrodes 108, may be formed on a single wafer. Cover 106 may be formed on a second wafer. Disc 104 may be formed on the same wafer as cover 106 or base 102, or on its own separate wafer. Assembly of the base and disc may occur before etching of sacrificial layers around disc 104 occurs. In some embodiments, each wafer may contain components for more than one disc drive. Also, separate components may be batch fabricated and assembled in a pick-and-place or batch transfer method.

FIG. 2 illustrates an exemplary disc drive 140 manufactured using MEMS techniques. Disc drive 140 includes a base 164 and a cover 142 that form a sealed housing of disc drive 140. Within the housing, integrated actuation electrodes 150 interact with disc 172 to rotate disc 172 about spindle 158. For example, disc 172 may include integrated magnets or electrostatic elements to receive actuation forces from integrated actuation electrodes 150.

Disc 172 includes a media surface 156, which may comprise, for example, magnetic particles. Disc 172 may optionally include a shield layer (not shown in FIG. 2) below media surface 156 to protect media surface 156 from electromagnetic fields cause by actuation electrodes 150 of disc 172. Disc 172 may also include fluid bearing features that create a boundary layer to keep disc 172 from contacting base 164 during operation of disc drive 140. Spindle 158 may also include fluid bearings to prevent disc 172 from contacting spindle 158 during operation of disc drive 140. In this manner, disc 172 is constrained not only by spindle 158, but also by boundary layer fluid pressure forces from fluid bearings.

Actuator arm 162 holds head 160 in close proximity to media surface 156. Head 160 traverses media surface 156 of disc 172 to read from and/or write to media surface 156. For example, actuator arm 162 may actuate head 160 with a stroke of at least 0.5 millimeters. The stroke is the maximum movement distance of head 160 in a plane parallel to media surface 156 provided by the range of motion of actuator arm 162. As other examples, actuator arm 162 may actuate head 160 with a stroke of at least 1 millimeter, with a stroke of at least 3 millimeters, with a stroke of at least 5 millimeters, with a stroke of at least 10millimeters, with a stroke of at least 15 millimeters, with a stroke of at least 20 millimeters, or with a stroke of at least 25 millimeters.

Coil 170 interacts with magnet 152 to actuate actuator arm 162 about bearing 168. MEMS techniques provide for very precise layer thicknesses such that smaller tolerances need to be taken into account in the design of disc drive 140. For this reason, coil 170 may be located at a distance of less than 25 micrometers from magnet 152. For example, coil 170 may be located at a distance of less than 20 micrometers from magnet 152. As other examples, coil 170 may be located at a distance of less than 15 micrometers from magnet 152, a distance of less than 10 micrometers from magnet 152, or a distance of less than 5 micrometers from magnet 152. In other embodiments, the locations of magnet 152 switched with coil 170 such that magnet 152 is part of actuator arm 162 and coil 170 is fixed to cover 142. In other embodiments, magnet 152 may be replaced a coil that interacts with coil 170. Such embodiments also allow for a gap between the two coils that is as small as the gap between coil 170 and magnet 152.

Disc drive 140 includes many features that would be difficult or even impossible to include in disc drive manufactured using conventional techniques. For example, disc drive 140 includes motion limiters 163. Because MEMS techniques provide for very precise layers, motion limiters 163 are located in close proximity to actuator arm 162. For example, motion limiters 163 may be located at a distance of less than 25 micrometers from actuator arm 162 or a distance of less than 20 micrometers from actuator arm 162. As other examples, motion limiters 163 may be located at a distance of less than 15 micrometers from actuator arm 162, a distance of less than 10 micrometers from actuator arm 162, or a distance of less than 5 micrometers from actuator arm 162.

As another example, disc drive 140 includes an integrated sensor 146. Integrated sensor 146 may be, e.g., a thermometer, gyroscope, position sensor, pressure sensor, or accelerometer. Integrated sensor 146 may measure ambient conditions within the drive which may be useful to, e.g., to control head-disc spacing. As another example, integrated sensor 146 may be used to detect shocks. For example, in the event of a shock, head 160 may be moved away from media surface 156 to prevent damage to media surface 156.

Disc drive 140 also includes an integrated environmental control component 154, which may include one or both of a resistive heating element and/or a Peltier cooling system. Disc drive 140 may also include control circuitry integrated within its housing. In this manner, disc drive 140 does not require a separate printed circuit board to control its operation. However, disc drive 140 may mount to a printed circuit board as part of a larger device, e.g., a cell phone or other consumer electronic device.

Disc drive 140 further includes vias 148 integrated into its housing; vias 148 include an electrically conductive paths 149, which may allow multiple disc drive 140 provide an interface for another disc drive. For example, disc drive 140 may mount to a printed circuit board and another disc drive may mount on top of disc drive 140 using bond pads 144 and communicate with the printed circuit board through electrically conductive paths 149 of vias 148.

Figure 3:
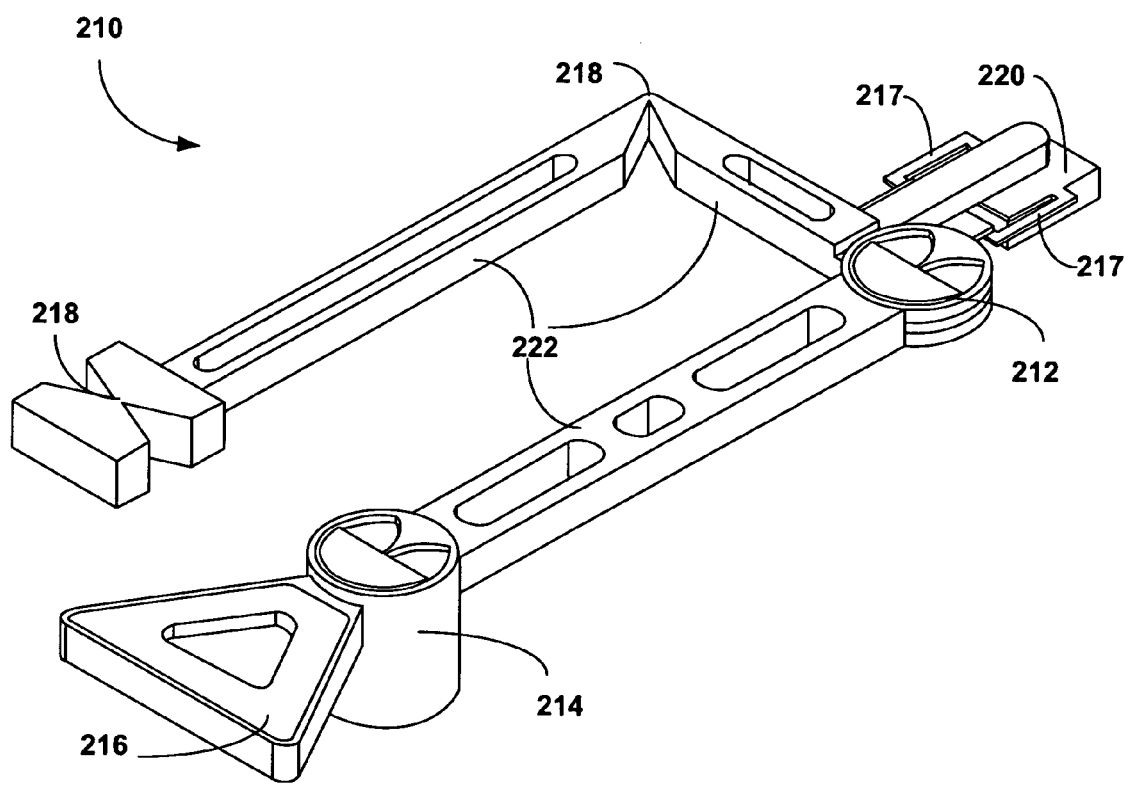
FIG. 3 illustrates a micromachined four-bar linkage actuator and suspension for a head.

FIG. 3 illustrates micromachined four-bar linkage actuator 210 that supports head 220. Actuator 210 may be an actuator for a disc drive manufactured using MEMS techniques. For example, actuator 210 may be fabricated from electroformed metal. Actuator 210 may also be formed as an integrated component of a disc drive, e.g., actuator 112 in FIG. 1. Actuator 210 includes beams 222, integrated coil 216 and head 220. Actuator 210 also includes integrated electrical interconnects to drive coil 216, and head 220. Actuator 210 is an integrated head suspension, actuation coil and bearing structure. Rotary bearings 212 and 214 and flexural bearings 218 provide, in combination with beams 222, a single degree of motion for head 220. Rotary bearings 212 and 214 include limiters to constrain the motion of actuator 210. Other embodiments may substitute a different arrangement of rotary, flexural or other bearings as part of the four-bar linkage design for bearings 212, 214 and 218.

Rotary bearings 212 and 214 and flexural bearings 218 have small heights as measured along their axis of rotation. For example, rotary bearings 212 and 214 and flexural bearings 218 may have heights of less than 5 millimeters. As other examples, rotary bearings 212 and 214 and flexural bearings 218 may have heights of less than 4 millimeters, of less than 3 millimeters, of less than 2 millimeters or of less than 1 millimeter. The small heights of rotary bearings 212 and 214 and flexural bearings 218 allow for a disc drive design with a lower Z-height.

Actuator 210 moves using coil 216 by creating an electromagnetic field to interact with a permanent magnet fixed to a housing of a disc drive. While actuator 210 includes coil 216 for primary actuation, other embodiments may be actuated by different means. For example, thermal, electrostatic, piezoelectric and electro-active polymer actuation techniques may be used. In another example, coil 216 may be replace with a magnet and interact with a fixed-position coil. Coil 216 may be formed by electroplating, winding or constructed as a flexible circuit and assembled onto actuator 210. For example, assembly may includes pick and place techniques.

Actuator 210 also includes secondary actuation mechanism 217 integrated with head 220 to provide fine positioning of the head 220 relative to a media surface of the disc drive. Secondary actuation mechanism 217 may include one or more of the following mechanisms for actuation: piezoelectric crystals, electromagnetic actuators, electroactive polymers and/or galvanometers.

Actuator 210 may be formed using MEMS processes. For example, integrated conductive paths may be formed within structural components of actuator 210. E.g., head 220 may be powered by and communicate through such conductive paths.

Actuator 210 has many advantages. The four-bar design of actuator 210 may minimize skew and improve the performance of head 220 by maintaining a precise distance above a media surface in a disc drive (not shown). Furthermore, coil 216 may be plated in the same process sequence as the corresponding permanent magnet, which allows for a very small gap between the permanent magnet and coil 216. This small spacing increases the force that may be achieved to drive actuator 210, or, alternatively, a much smaller permanent magnet and/or coil. This increase in efficiency allows for a disc drive design with a reduced package height. Also actuator 210 can incorporate a head gimbal assembly with slider motion limiters with very small tolerances. For example, tolerances of less then ten micrometers are possible.

Beams 222 may be formed using electroplating and multiple pattern layers. For example, beams 222 may include an internal three-dimensional truss structure to increase strength and stiffness of beams 222, while reducing mass. An example, embodiment of such a truss structure is shown in FIGS. 5.

Figure 4:
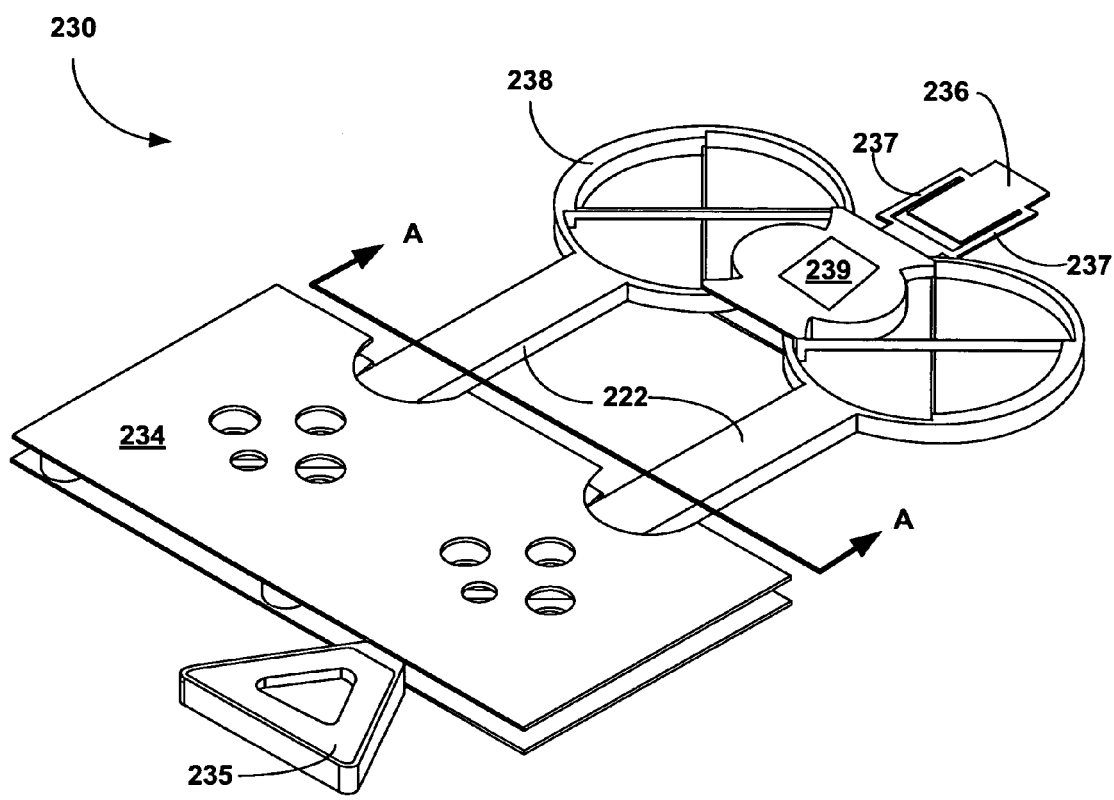
FIG. 4 illustrates a micromachined four-bar linkage actuator and suspension for a head.

FIG. 4 illustrates micromachined four-bar linkage actuator 230 that supports head 236. The suspension structure of actuator 230 includes beams 232 mounted to plates 234, flexural bearings 238 and head 236. Flexural bearings 238 provide, in combination with beams 232 and plates 234, a single degree of motion for head 236. Actuator 230 also includes head 236 and integrated electrical interconnects to drive coil 235 and head 236. Actuator 230 is an integrated head suspension, actuation coil and bearing structure.

Flexural bearings 238 have small heights as measured along their axis of rotation. For example, flexural bearings 238 may have heights of less than 5 millimeters. As other examples, flexural bearings 238 may have heights of less than 4 millimeters, of less than 3 millimeters, of less than 2 millimeters or of less than 1 millimeter. The small heights of flexural bearings 238 allow for a disc drive design with a lower Z-height.

Actuator 230 moves using coil 235 by creating an electromagnetic field to interact with a permanent magnet fixed to a housing of a disc drive. Actuator 230 also includes secondary actuation mechanism 237 integrated with head 236 to provide fine positioning of the head 236 relative to a media surface of the disc drive. Secondary actuation mechanism 237 may include, for example, one or more piezoelectric crystals.

A constant force is required to counteract the elasticity of flexural bearings 238 to hold actuator 230 in a position other than a centered position. While actuator 230 includes coil 235 for primary actuation, other embodiments may be actuated by different means. For example, thermal, electrostatic, piezoelectric and electro-active polymer actuation techniques may be used. In another example, coil 235 may be replaced with a magnet and interact with a fixed-position coil. Coil 235 may be formed by electroplating, winding or constructed as a flexible circuit and assembled onto actuator 230. For example, assembly may includes pick and place techniques.

[0056] Flexural bearings 238 may be made from multiple layers fabricated using MEMS techniques. Each of the layers in flexural bearings 238 only flexes a small portion of the total flexture of flexural bearings 238. The multiples layer allow for high flexibility in flexural bearings 238. The high flexibility of flexural bearings 238 reduces the actuation force required to move actuator 230.

Actuator 230 may be an actuator for a disc drive manufactured using MEMS and/or batch fabrication techniques. For example, actuator 230 may be fabricated from electroformed metal. MEMS processes allow a variety of complex features to be integrated as part of actuator 230. For example, integrated conductive paths may be formed within structural components of actuator 230, e.g., head 236 may be powered by and communicate through such conductive paths. Actuator 230 may also be formed as an integrated component of a disc drive, e.g., actuator 112 in FIG. 1.

Actuator 230 also includes integrated sensor 239. Integrated sensor 239 may be, e.g., a thermometer, gyroscope, position sensor, pressure sensor, or accelerometer. Integrated sensor 239 is located in a position that may be useful to detect external shocks which may result in head 236 contacting a media surface of a disc. To prevent damage to the media surface and to head 236, in the event of a shock, head 160 may be moved away from media surface 156. As another example, integrated sensor 1239 may measure ambient conditions within a disc drive of actuator 230 which may be useful to, e.g., to control head-disc spacing.

Actuator 230 has many advantages. The four-bar design of actuator 230 may minimize skew and improve the performance of head 236 by maintaining a precise distance above a media surface in a disc drive (not shown). Furthermore, coil 235 may be plated at the same time as the corresponding permanent magnet, which allows for a very small gap between the permanent magnet and coil 235. This small spacing increases the force that may be achieved to drive actuator 230, or, alternatively, a much smaller permanent magnet and/or coil. This increase in efficiency allows for a disc drive design with a reduced package height. Also actuator 230 can incorporate a head gimbal assembly with slider motion limiters with very small tolerances. For example, tolerances of less then ten micrometers are possible.

Beams 222 may be formed using electroplating and multiple pattern layers. For example, beams 222 may include an internal three-dimensional truss structure to increase strength and stiffness of beams 222, while reducing weight. An example, embodiment of such a truss structure is shown in FIGS. 5.

FIGS. 5 illustrate three-dimensional truss structure 250, which may be used as part of a micromachined actuator. As referred to in this document, a three-dimensional truss structure is a truss structure than can not be represented by extruding a two-dimensional cross-section of the truss structure along a continuous path. Truss structure 250 may be formed using a multi-level electroplating process. FIG. 5A shows a side view of truss structure 250 and FIG. 5B shows a perspective view of truss structure 250 with top plate 252 hidden. Truss structure 250 includes top plate 252, bars 256 and bottom plate 254. Each of bars 256 extend between top plate 252 and bottom plate 254. In other embodiments, some bars may extend between a plate and another bar or between two bars.

Truss structure 250 may be formed by electroplating and multiple pattern layers. Bars 256 require ten separate layers of patterning. Because each pattern lay can be separately formed, truss structure 250 can be very complex. For example, truss structure 250 may include multiple sets of non-parallel bars.

Truss structure 250 may provide a relatively stronger and lighter structure. Bars 256 can be designed to support loads in one or more directions. Because truss structure 250 provides for a small, strong and lightweight design, it may be suitable to form part of a disc drive head actuator and, more specifically, a small form factor disc drive head actuator. For example, truss structure 250 may be used to form one or more bars and or a head mount in a disc drive head actuator. However, other uses of truss structure 250 are also possible.

Figure 6A:
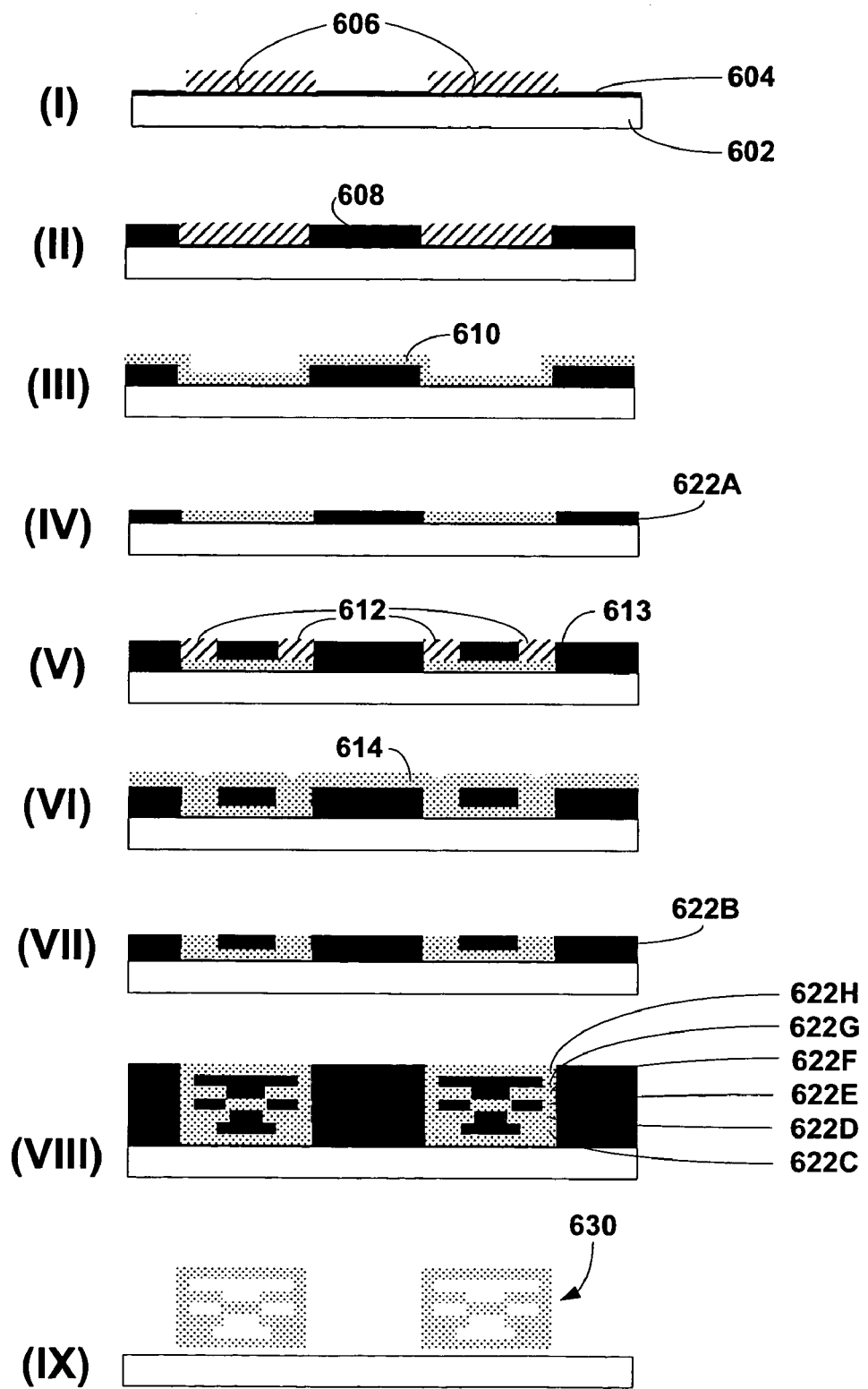
FIGS. 6A-6B illustrate techniques for manufacturing disc drive head actuators using MEMS techniques.
Figure 6B:
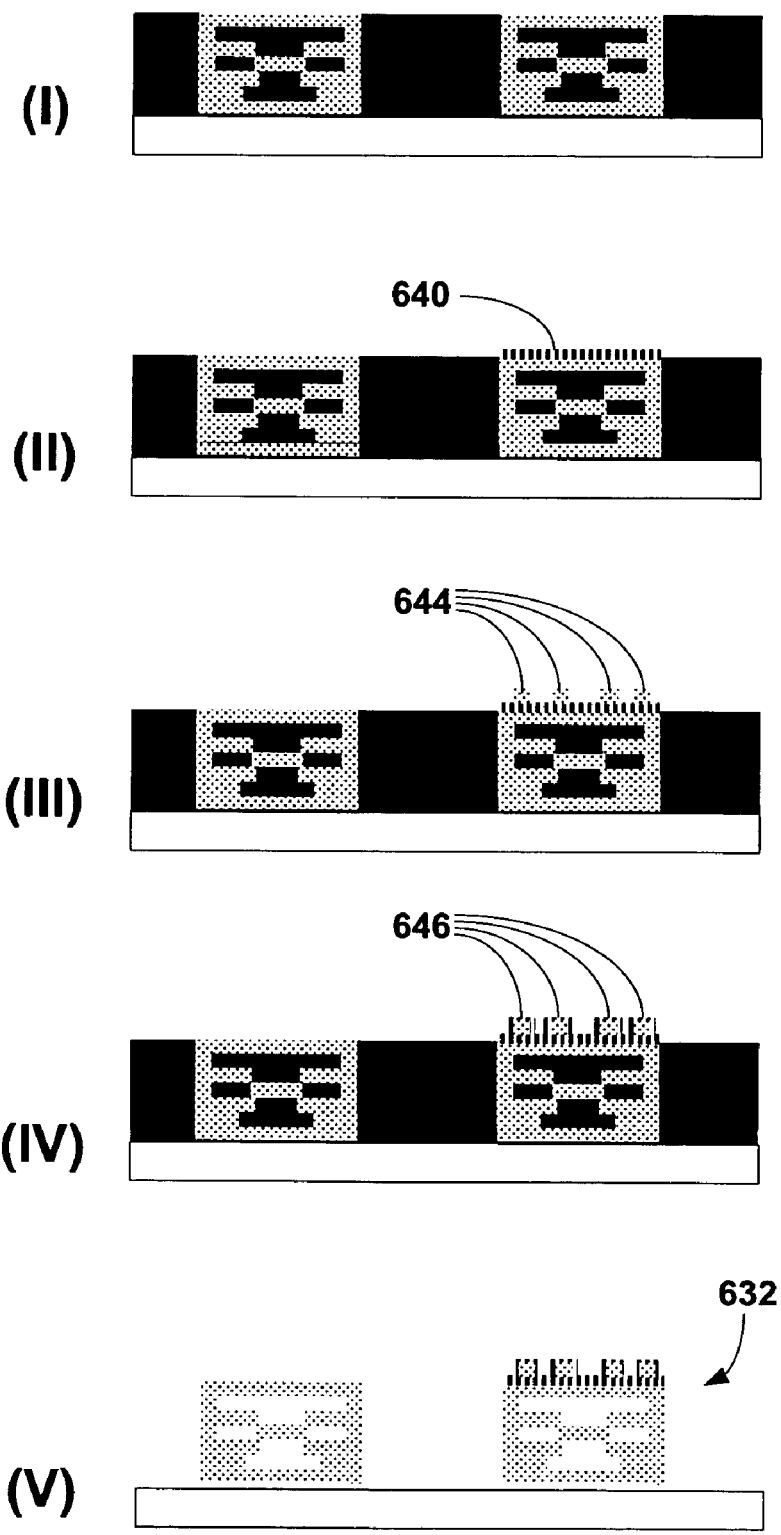

FIGS. 6A-6B illustrate techniques for manufacturing disc drive head actuator 630 and disc drive head actuator 632 using MEMS techniques. Actuators 630 and 632 may be the same as actuator 230 of FIG. 4. The viewpoint for FIGS. 6A-6B is shown as line A-A in FIG 4. Actuators 630 and 632 are formed in incremental layers on substrate 602. Actuators 630 and 632 may include internal three-dimensional truss structures.

Steps I, II, III, and IV, shown in FIG. 6A, produce layer 622, which is the first layer of structure for actuator 630. In step I, plating seed layer 604 is deposited on substrate 602 and sacrificial structures 606 are patterned on plating seed layer 604. For example, plating seed layer 604 may be copper. In step II, sacrificial layer 608 is plated on top of plating seed layer 604. For example, sacrificial layer 608 may be copper. In step III, sacrificial structures 606 are removed and the first layer of structural material 610 is electroplated on top of the mold formed by sacrificial layer 608. As an example, structural material 610 may be a Nickel alloy. In step IV, layer 622A is completed by planarizing to produce the desired height of layer 622A.

The process of steps I-IV are repeated as shown in steps V-VII to produce layer 622B, which is the second layer of structure for actuator 630. In step V, sacrificial structures 612 are patterned layer 622A and sacrificial layer 613 is plated on top of sacrificial structures 612 and patterned layer 622A. For example, sacrificial layer 613 may be copper. In step VI, sacrificial structures 612 are removed and the second layer of structural material 614 is electroplated on top of the mold formed by sacrificial layer 613. As an example, structural material 613 may be a Nickel alloy. In step VII, layer 622B is completed by planarizing to produce the desired height of layer 622B.

These process steps are repeated again for each of layers 622C-622H to produce the structure shown in step VIII. In step IX, the sacrificial material including sacrificial layer 608 and sacrificial layer 613 is removed using wet or dry etching. This releases actuator 630 from substrate 602.

FIG. 6B illustrates process steps for adding an actuation coil to the structure of an actuator manufactures as shown in FIG. 6A. Step I is the same as shown in step VIII of FIG. 6A. In step II, insulative layer 640 is patterned on top of the actuator structure material. In step III, metal coil structures 644 is deposited or patterned on top of insulative layer 640. In step, IV, insulative layer. 646 is patterned on top metal coil structures 644 and insulative layer 640. In step V, the sacrificial material is removed using wet or dry etching. This releases actuator 632 from substrate 602.

Actuators 630 and 632 may include additional features not shown in FIGS. 6A-B. For example, actuators 630 and 632 may be integrated with a head used to read to or write from a media disc in a disc drive. Actuators 630 and 632 may also contain integrated control circuitry integrated and additional electrical connection vias. Each of these features may be manufactured using MEMS techniques. The same steps as illustrated in FIGS. 6A-6B may also be used to manufacture at least two disc drive head actuators on a common substrate.

A number of embodiments of the present invention have been described. Nevertheless, it will be understood that various modifications may be made without departing from the spirit and scope of the invention. For example, wafers used in the manufacture of MEMS disc drives may include components for more than one disc drive. As another example, an integrated head suspension, actuation coil and bearing structure may not include a four-bar linkage. For example a simple load beam could be used instead. Accordingly, these and other embodiments are within the scope of the following claims.

The invention claimed is:

1. A disc drive head actuator comprising:
 a suspension structure comprising a four-bar linkage with a rigid beam, a bearing and a rotary actuation mechanism adapted to rotate the beam about a stationary rotational axis of the bearing; and
 a slider integrated with the suspension structure, wherein the actuator is one of at least two actuators batch-fabricated on a common substrate.

2. The disc drive head actuator of claim 1, further comprising a transducer integrated with the slider and the suspension structure.

3. The disc drive head actuator of claim 2, wherein the bearing is characterized as a rotary bearing adapted to be mounted to a housing member of a data storage device in which the actuator is disposed so that rotary actuation of the beam by the actuation mechanism moves the transducer adjacent a data storage surface.

4. The disc drive head actuator of claim 3, wherein the beam is characterized as a first beam and the four-bar linkage includes:
 a second beam;
 a third beam; and
 a flexural bearing, wherein the flexural bearing provides a pivot point that allows the third beam to rotate relative to the second beam.

5. The disc drive head actuator of claim 1, wherein the bearing is disposed between the beam and the actuation mechanism and affixed to a housing member so that the beam moves adjacent a data storage surface of a storage medium.

6. The disc drive head actuator of claim 1, wherein the actuation mechanism comprises a voice coil batch fabricated with the four-bar linkage, wherein the voice coil a component of an actuation motor that actuates the actuator.

7. The disc drive head actuator of claim 1, wherein the suspension structure includes a beam having a three-dimensional truss-structure constructed of bars configured in triangular shapes.

8. The disc drive head actuator of claim 1, further comprising a second bearing connected between the beam and the slider.

9. The disc drive head actuator of claim 8, wherein the second bearing has a thickness of less than 4 millimeters as measured along its axis of rotation.

10. The disc drive head actuator of claim 1, further comprising a secondary actuation mechanism integrated with the slider and the suspension structure as part of the batch fabrication, wherein the secondary actuation mechanism provides fine positioning of the slider relative to a media surface of a disc drive that includes the disc drive head actuator.

11. A disc drive head actuator comprising:
 a first rigid beam;
 a second rigid beam connected to a third rigid beam via a rotary bearing; and
 a flexural bearing coupled to a proximate end of the third beam, the flexural bearing providing a pivot point that allows actuation of the third beam and having a thickness of less than 4 millimeters as measured along its axis of rotation, wherein the first beam, second beam, third beam, flexural bearing, and rotary bearing form part of a four-bar linkage.

12. The disc drive head actuator of claim 11, wherein the actuator is one of at least two actuator assemblies batch-fabricated on a common substrate.

13. The disc drive head actuator of claim 11, wherein a distal end of the beam has a stroke of at least 0.5 millimeters during the actuation of the beam.

14. The disc drive head actuator of claim 11, wherein the flexural bearing is a first flexural bearing and the third beam has a second flexural bearing.

15. The disc drive head actuator of claim 11, wherein the beam includes a three dimensional truss structure, the three dimensional truss structure comprising:
 a bottom skin having an interior surface;
 a top skin having an interior surface opposing the interior surface of the bottom skin; and
 a core positioned between the bottom skin an top skin and affixed to the interior surfaces of the bottom skin and the top skin including:
  a first set of bars, wherein the bars of the first set of bars are substantially parallel to each other, and
  a second set of bars, wherein the bars of the second set of bars are substantially parallel to each other and non-Oparallel to the bars of the first set of bars.

16. The disc drive head actuator of claim 11, wherein the flexural bearing includes multiple layers deposited during a batch fabrication process.

17. A method comprising:
 constructing a plurality of structural layers of a disc drive head actuator on a substrate with at least two different patterns to form a portion of the disc drive head actuator, the plurality of structural layers constructing a three-dimensional truss defined by multiple pyramidal shapes each comprising straight bars connected at a common joint; and
 releasing the least two structural layers from the substrate to separate the disc drive head actuator from the substrate.

18. The method of claim 17, wherein forming a structural layer of the at least two structural layers includes:
 patterning a sacrificial mold layer;
 electroplating a structural material of the structural layer over the sacrificial mold layer; and
 planarizing the structural material.

19. The method of claim 18, wherein releasing the least two structural layers from the substrate includes etching the sacrificial mold layer.

20. The method of claim 18, wherein the sacrificial mold layer includes copper.

21. The method of claim 17, wherein the at least two structural layers include nickel.

22. The method of claim 17, wherein the disc drive head actuator is one of at least two disc drive head actuators formed together on the substrate using batch fabrication.

23. An actuator comprising a four-bar linkage with first, second and third rigid beams intercoupled with bearings therebetween, a slider which supports a data transducer, a primary actuation mechanism adapted to rotate the actuator about a fixed rotational axis, and a secondary actuation mechanism adapted to rotate the slider relative to the first, second and third rigid beams.

24. The actuator of claim 23, wherein a first bearing is connected to a first end of the first beam and a second bearing is connected to an opposing end of the first beam, the primary actuation mechanism is connected to the first bearing opposite the first beam, and the first bearing is contactingly affixed to a base member of a data storage device in which the actuator is disposed so that the first beam rotates about the fixed rotational axis of the first bearing.

25. The actuator of claim 24, wherein the primary actuation mechanism is characterized as a coil of a voice coil motor and the secondary actuation mechanism is characterized as a microactuator.

26. The actuator of claim 24, wherein the second bearing is disposed between the first and second beams, and the slider extends from the second beam.

27. The actuator of claim 23, wherein at least one of said bearings is a flexure bearing.

28. A disc drive head actuator comprising:

a suspension structure; and a slider and an accelerometer integrated with the suspension structure, wherein the actuator is one of at least two actuators batch-fabricated on a common substrate.

29. The actuator of claim 28, wherein the suspension structure comprises a four-bar linkage with a rigid beam, a bearing and a rotary actuation mechanism adapted to rotate the beam about a stationary rotational axis of the bearing.

* * * * *